Fig. 7.

Nov. 1, 1966  L. B. SWIFT, JR  3,282,003
MODULAR CONTROLLED ATMOSPHERE ENCLOSURE
Filed Jan. 12, 1962  10 Sheets-Sheet 7

Nov. 1, 1966     L. B. SWIFT, JR     3,282,003
MODULAR CONTROLLED ATMOSPHERE ENCLOSURE
Filed Jan. 12, 1962     10 Sheets-Sheet 9 ial view of the enclosure shown in FIG. 1;

United States Patent Office
3,282,003
Patented Nov. 1, 1966

3,282,003
MODULAR CONTROLLED ATMOSPHERE
ENCLOSURE
Laurence B. Swift, Jr., Attleboro Falls, Mass., assignor, by direct and mesne assignments, to Precision Engineering Concern Inc., Norton, Mass., a corporation of Massachusetts
Filed Jan. 12, 1962, Ser. No. 165,915
2 Claims. (Cl. 52—220)

This invention relates to modular controlled atmosphere enclosures, and methods of making same, and more particularly to prefabricated constructions therefor.

The present invention is particularly useful for so-called clean-room applications in which the interior atmosphere is controlled as to one or more conditions, such as for example, temperature, humidity, airborne dust or dirt content, and/or noise level.

Among the several objects of the present invention may be noted the provision of a modular controlled atmosphere enclosure which comprises a plurality of prefabricated wall and ceiling panel sections, and methods of making the same; the provision of a method and means for detachably securing adjacent wall panels together in aligned, sealed, abutting relationship; the provision of prefabricated wall panels, some of which include utilities disposed and maintained therewithin in fixed, assembled relation; the provision of such prefabricated wall panels wherein the utilities therein are maintained in fixed, assembled relation by a relatively incompressible, relatively dust-free, thermally insulating material, infilling the interior of said wall panels; and the provision of a modular controlled atmosphere enclosure and methods of making same, which provides for low-cost assembly and installation, wherein the prefabricated panel sections can also be easily and quickly disassembled to facilitate the interchange of panels and expansion or dismantling of the enclosure.

Other objects will be in part apparent and in part pointed out hereinafter.

The invention accordingly comprises the elements and combinations of elements, steps and sequence of steps, features of construction and manipulation, and arrangements of parts, all of which will be exemplified in the structures and methods hereinafter described, and the scope of the application of which will be indicated in the following claims.

In the accompanying drawings, in which one of the various possible embodiments of the invention is illustrated.

Similar reference characters indicate corresponding parts throughout the several views of the drawings.

Dimensions of certain of the parts as shown in the drawings have been modified and/or exaggerated for the purposes of clarity of illustration.

Presently known conventional clean-room or controlled atmosphere enclosure constructions generally involve in situ construction and erection. Conventional constructions also frequently employ dirt-creating thermal insulation in the walls and ceiling, which if not completely sealed, many times present problems in maintaining the dust or dirt level of the atmosphere within the enclosure to the required minimum.

Such prior conventional constructions require expensive labor to construct and erect the clean room or controlled atmosphere at the site, and oftentimes involve considerable disturbance to the work areas surrounding the installation site for extended periods of time during construction and erection. The present invention obviates, or at least minimizes these problems.

The present invention provides a modular controlled atmosphere enclosure which comprises a plurality of individual prefabricated wall and ceiling (or roof) panel sections, which can be quickly and easily erected and assembled. The panel sections can each be completely fabricated and engineered at the factory under controlled shop conditions, and with efficient labor.

In accordance with the invention, prefabricated sealed wall panels are also provided with utilities molded therein and maintained in fixed assembled relation therein by a relatively non-dirt creating thermally insulating material.

By means of the present invention, expensive on-the-site fabrication, and the delays and other hazards of "cut and try" on-the-site fabrication and installation are obviated or at least sharply reduced.

It will be seen from the ensuing description that standard size, interchangeable wall and ceiling panels may be employed, affording versatility in the building of new enclosures, or for modifying already existing enclosures, according to this invention.

Figure 1:
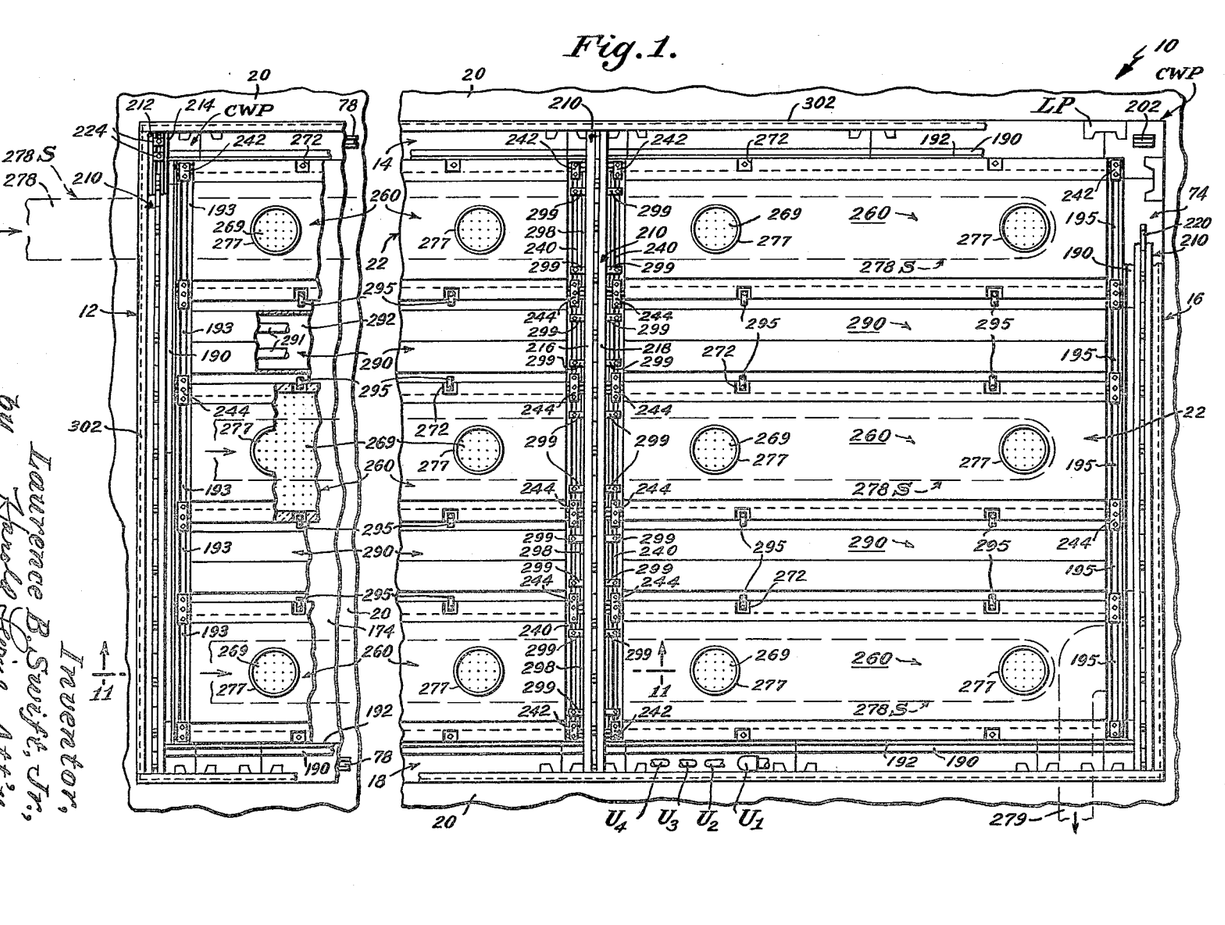
FIG. 1 is a top plan view, with parts broken away, of a modular controlled atmosphere enclosure embodying the present invention.
Figure 2:
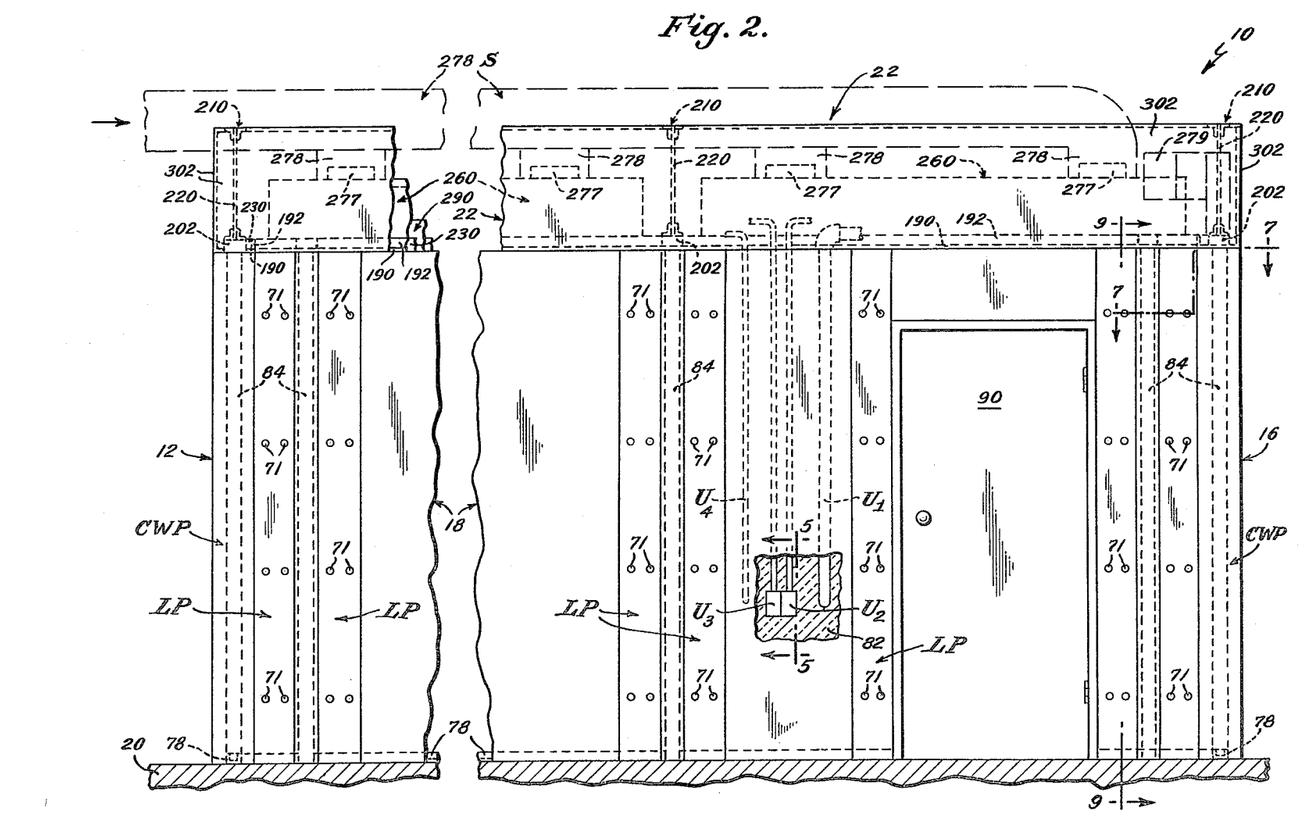
FIG. 2 is a front elevational view, with parts broken away, of the enclosure shown in FIG. 1.
Figure 3:
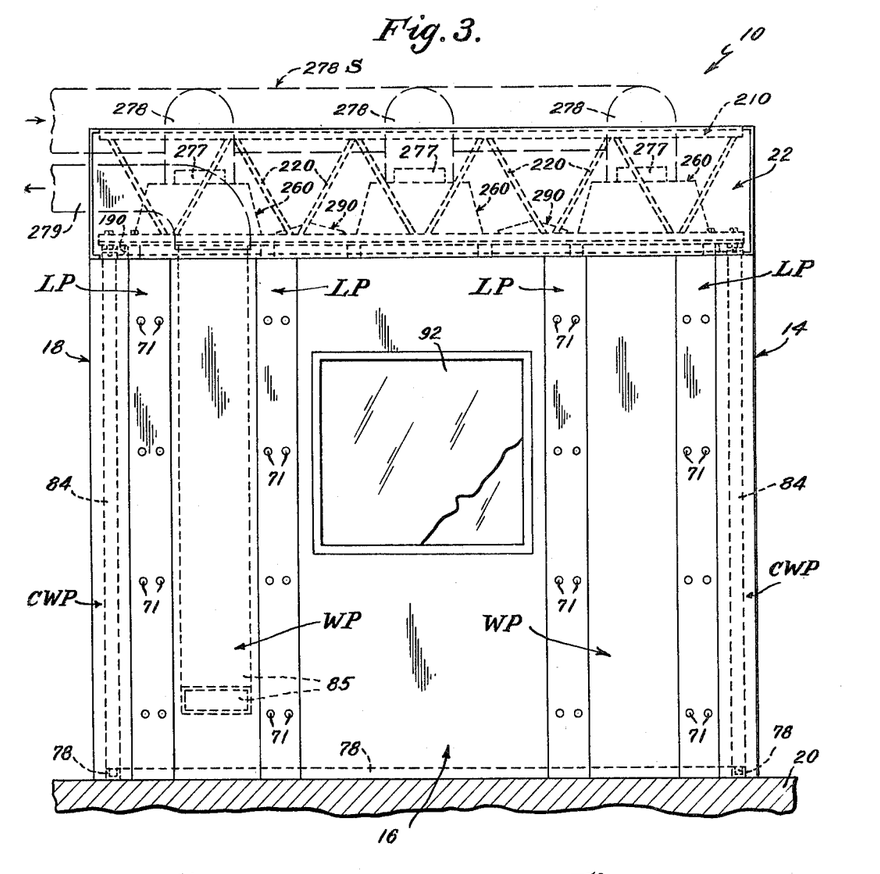
FIG. 3 is a right-hand elevational view of the enclosure shown in FIG. 1.

In the exemplary embodiment of the invention, as disclosed in the drawings particularly in FIGS. 1–3, a modular controlled atmosphere enclosure generally designated by numeral 10 is shown, which includes a plurality of spaced apart, vertically extending walls generally designated by numerals 12, 14, 16 and 18, which are supported on a floor or supporting surface 20. Enclosure 10 further includes a modular ceiling or overhead roof construction, generally designated by numeral 22.

Figure 6:
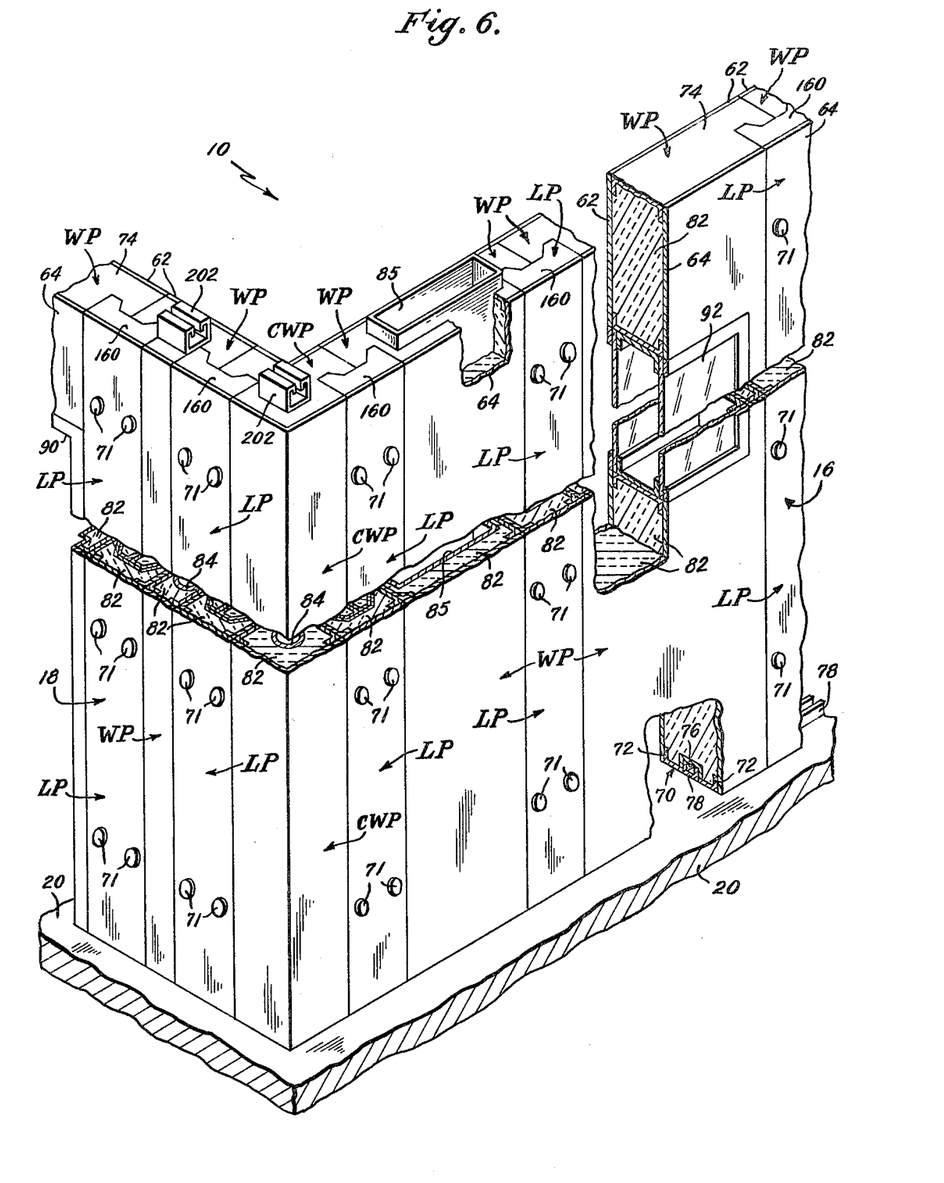
FIG. 6 is a fragmentary, perspective view, with parts broken away, of a portion of a corner of the enclosure shown in FIGS. 1 and 2.

Referring now to FIGS. 2 and 6, each of walls 12, 14, 16 and 18 comprise a plurality of prefabricated sealed wall and locking panel sections, respectively generally designated by WP and LP, with corner wall panel sections generally designated by CWP.

Figure 7:
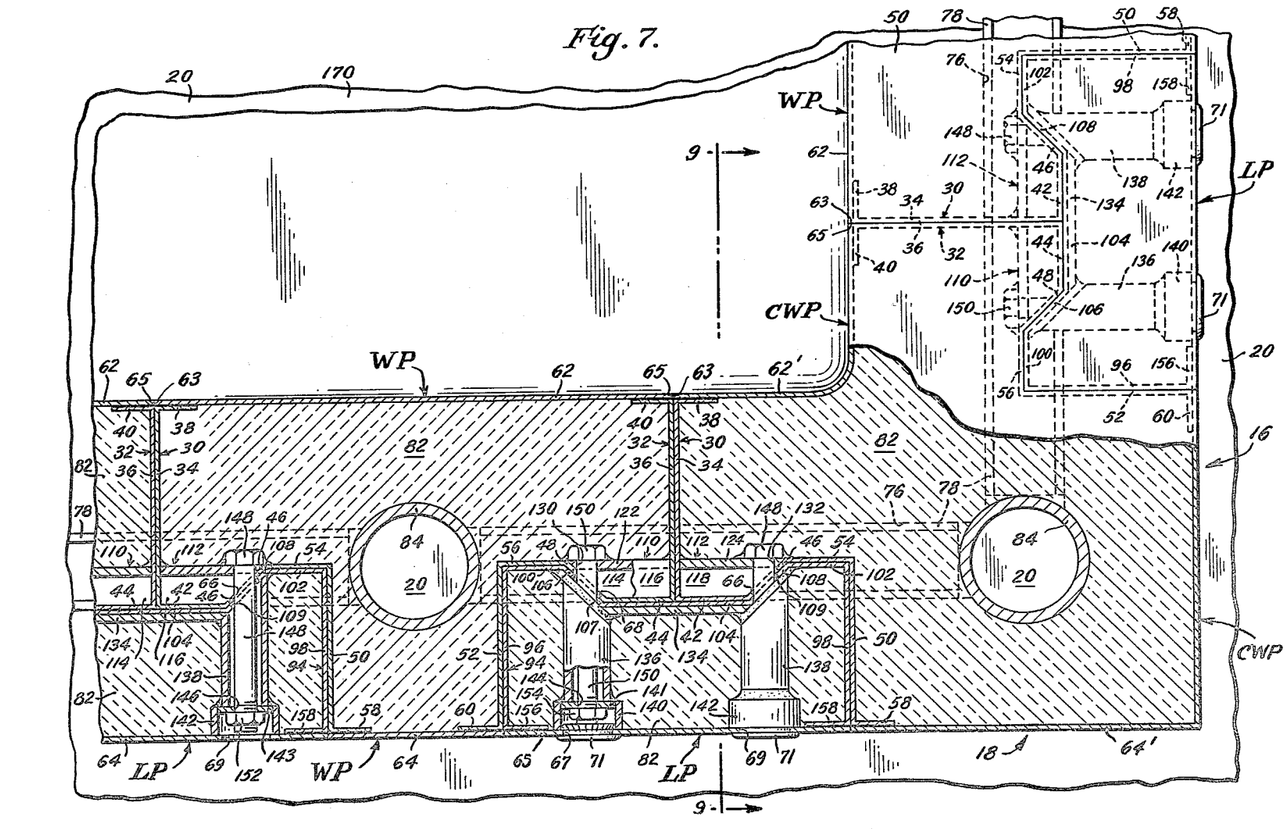
FIG. 7 is an enlarged, fragmentary sectional view taken substantially along line 7—7 of FIG. 2.

In FIG. 7 there is shown, in section, a plurality of typical prefabricated sealed wall panel and locking panel constructions, according to the present invention. Each of panel sections WP and CWP includes a pair of spaced, vertically extending structural members, generally designated by numerals 30 and 32. Each of members 30 and 32 define a respective end wall or an edge of its respective panel.

Each of structural members 30 and 32 respectively include an elongated, vertically extending plate section 34 and 36, the plane of which extends transversely to the wall panel WP. Each of plate members 34 and 36 is provided at one end thereof respectively with a flange 38 and 40 extending normally thereto, as shown.

Each of structural members 30 and 32 further respectively include a transversely extending plate section 50 and 52. As best seen in FIG. 7, each of sections 50 and 52 are respectively disposed in substantially parallel relation with sections 34 and 32, and each include an end portion disposed in overlapping, opposed relation respectively to a portion adjacent the other end of members 34 and 32. Member 30 further includes a pair of spaced, substantially parallel plate members 42 and 54 respectively connected to members 34 and 50 and extending normally thereto, as shown.

Figure 8:
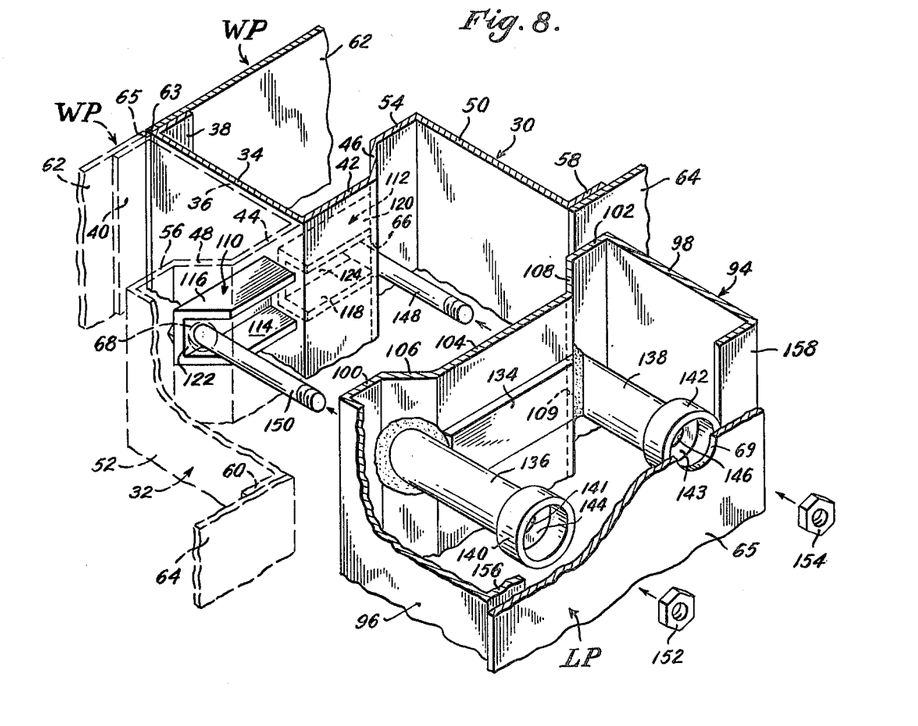
FIG. 8 is an enlarged, fragmentary exploded perspective view of portions of a pair of adjacent wall panels and of a locking panel forming part of the enclosure shown in FIGS. 1–3.

As best seen in FIGS. 7 and 8, plate sections 42 and 54 extend toward each other, but each extends less than half the distance between members 34 and 50. Member 32 also includes a pair of spaced, substantially parallel plate section 44 and 56 respectively connected to members 36 and 52, and extending normally thereto, as shown. As best seen in FIGS. 7 and 8, plate sections 44 and 56 also extend toward each other, but each extends less than half the distance between members 36 and 52.

The opposing ends of members 42, 54 and members 44, 56 are respectively interconnected by diagonally extending plate-like wedge surface providing members 46 and 48. Members 48 and 46 respectively of adjacent abutting members 32 and 30, may be described as converging toward the exterior of enclosure 10 or diverging toward the interior of enclosure 10, when members 30 and 32 of adjacent wall panels are aligned and abutting, as shown in FIG. 7 and suggested in FIG. 8.

Each of diagonal or wedge members 46 and 48 are respectively provided with a bolt-receiving opening 66 and 68. The other end of each of members 50 and 52 is respectively provided with a flange 58 and 60 which, in the wall panel section WP as best seen in FIG. 7, extend in a direction toward each other. The exterior surfaces of each of flanges 38 and 40, and of flanges 58 and 60, are substantially coplanar. Each of structural members 30 and 32 are formed of a suitable material, for example, steel. Each of members 30 and 32 are preferably integrally formed, but may be totally or partially fabricated, if desired.

The wall panel sections WP and CWP also include an interiorly facing, relatively thin, sheet-like sidewall or skin member 62, and an exteriorly facing, relatively thin, sheet-like sidewall or skin member 64. Skin members 62 and 64 may be formed, for example, of aluminum, and may be provided with any desired surface finish. A baked enamel or a dull anodized finish are suitable finishes for cleanliness control. According to another feature of the present invention, each of skin members 62 and 64 are disposed in interfacial abutting relationship respectively with flange members 38, 40 and 58, 60, and are interfacially bonded thereto by means of an adhesive cement. A suitable contact adhesive or cement for the purpose is, for example, an epoxy or an epoxy phenolic or thermosetting resinous material. The bond lines respectively between skins 62 and 64, and flanges 38, 40 and 58, 60 are indicated by heavy lines in FIG. 7. The skins 62 and 64 are sealed throughout substantially their entire interfacial contact respectively with flanges 38, 40 and 58, 60 to provide a substantially air tight sealed wall panel construction. The edges 63 and 65 of skin 62 are disposed substantially flush respectively with the outer surfaces of members 34 and 36, respectively of structural members 30 and 32, as best seen in FIG. 7. The adhesive bonds between the skins 62 and 64 and the structural members 30 and 32 advantageously do not disrupt the smooth surface finishes of the skins or increase the burdens of cleanliness control within enclosure 10.

Figure 9:
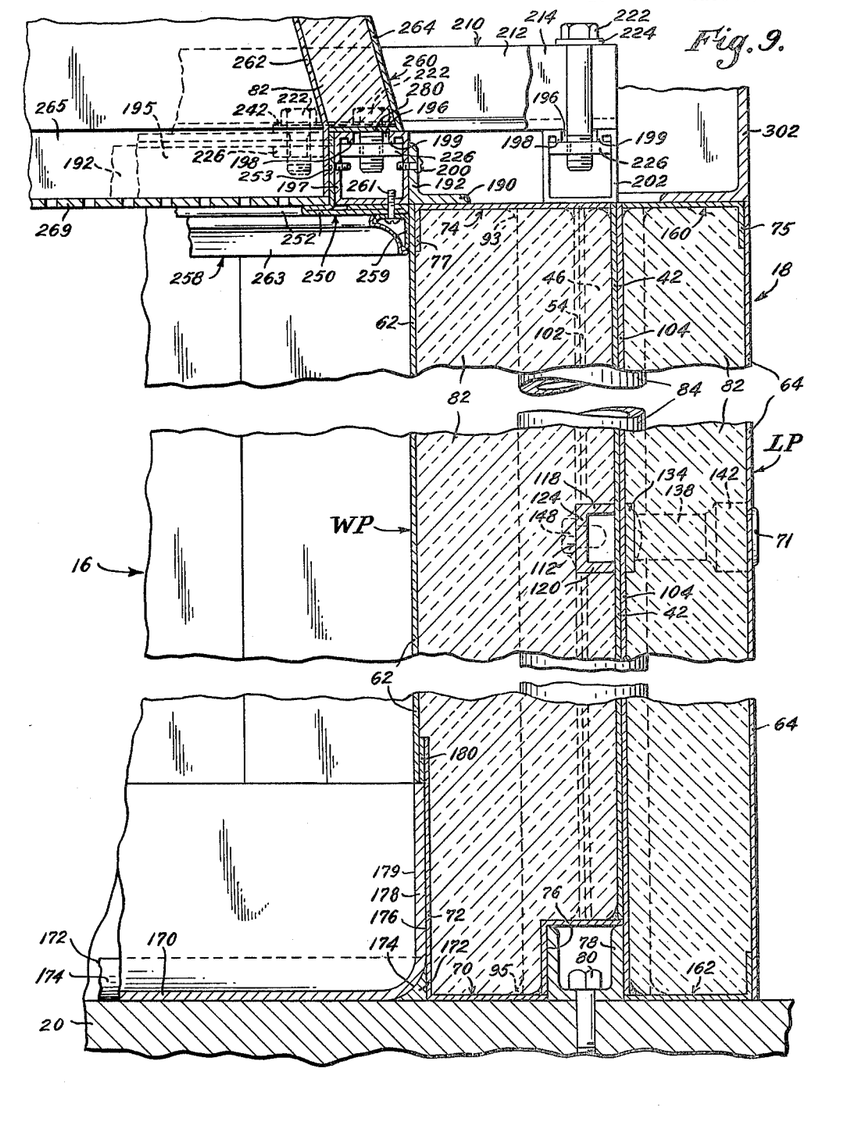
FIG. 9 is a sectional view taken substantially along line 9—9 of FIGS. 2 and 7.
Figure 11:
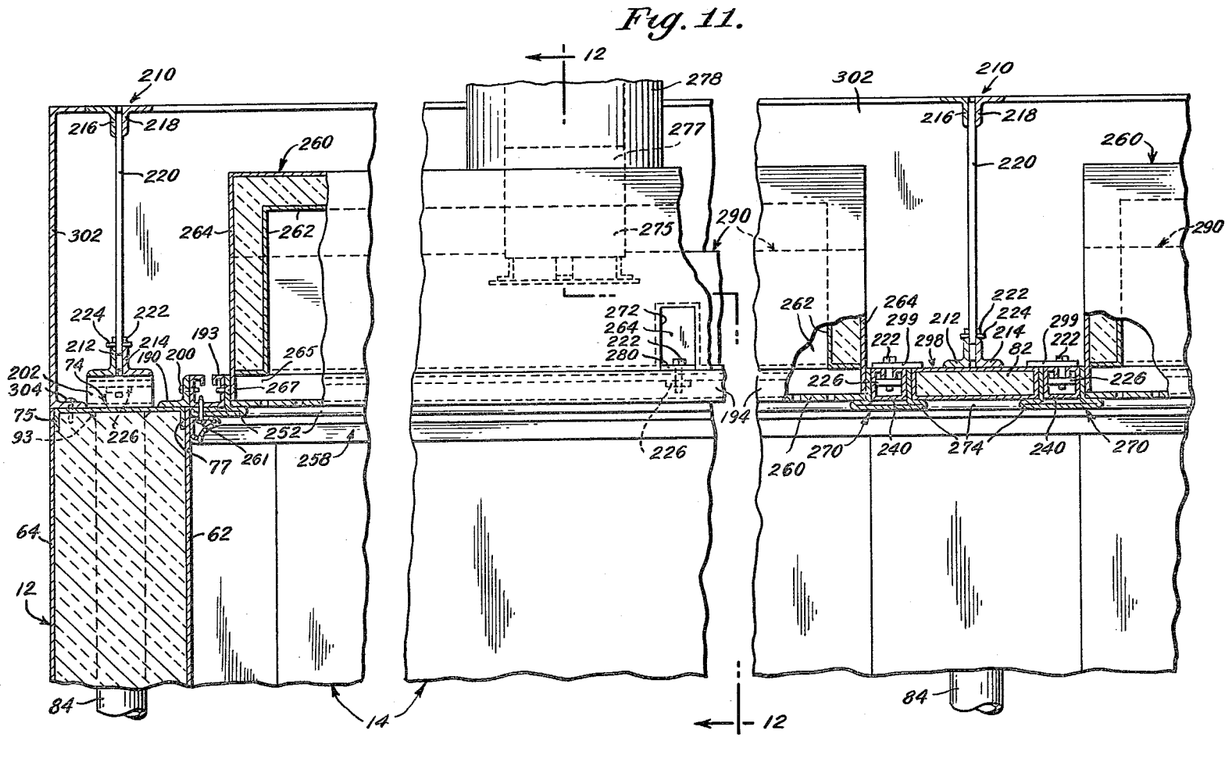
FIG. 11 is a fragmentary, sectional view taken substantially along line 11—11 of FIG. 1.
Figures 12, 13:
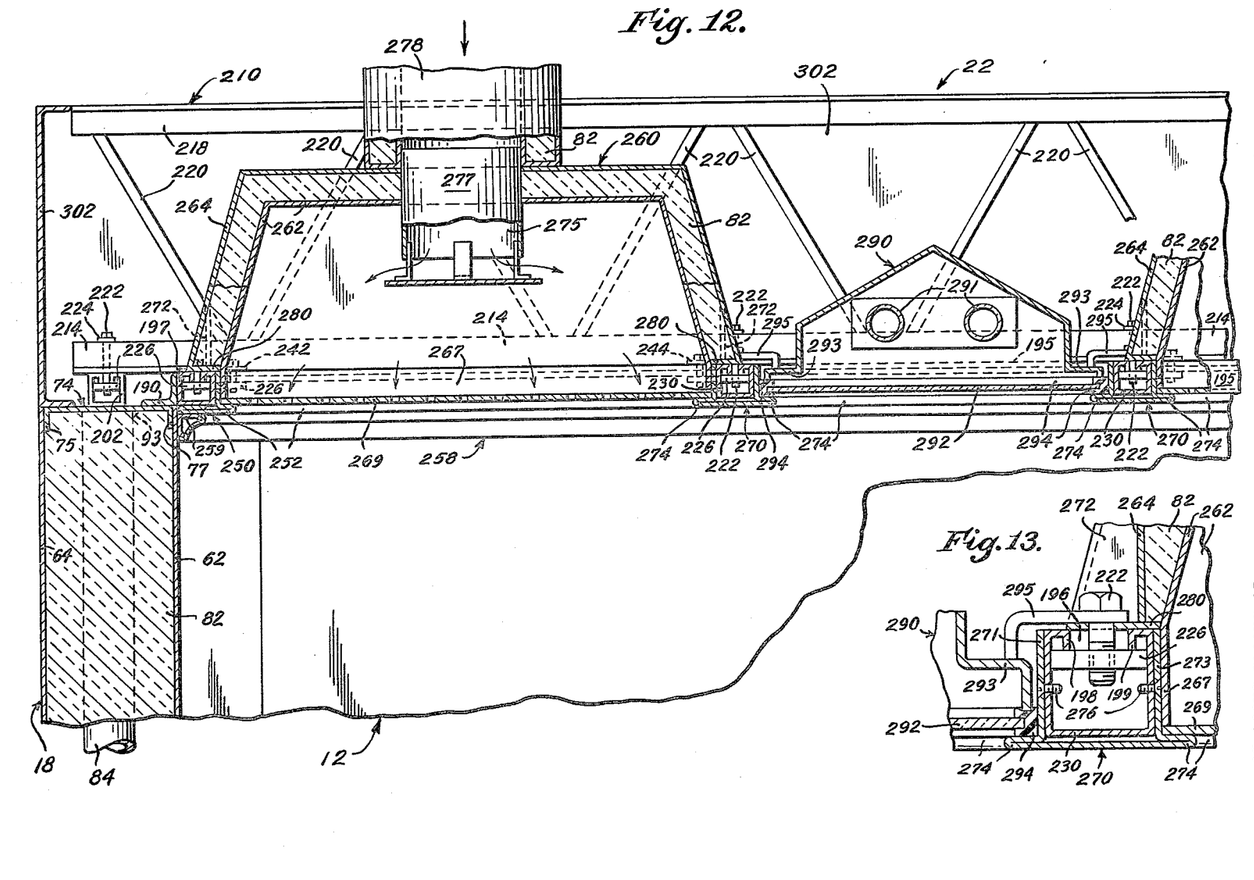
FIG. 12 is a fragmentary, sectional view taken substantially along line 12—12 of FIG. 11.
FIG. 13 is an enlarged, fragmentary view of a portion of the ceiling structure shown in FIG. 12.

Referring now to FIG. 9, wall panel WP is provided with a channel-shaped structural member (formed, for example, of steel) generally designated by numeral 70, extending longitudinally along the bottom of the wall panel. Structural member 70 includes a pair of upstanding flange portions 72 (see FIG. 6) which are respectively interfacially bonded to skin members 62 and 64 by a suitable adhesive, such as one of the epoxy, thermosetting resinous materials mentioned above. Member 70 is also welded to each of structural members 30 and 32 to maintain the sealed integrity of the panel. Member 70 provides a longitudinally extending opening 76 for reception of a locating channel 78 which is fixed to floor 20 by means 80 which may, for example, comprise a lag screw or bolt member. It will be understood that all of the wall and corner panel sections WP and CWP are provided with suitable channel-shaped, bottom wall defining members similar to member 70 described above, which are bonded to skins 62 and 64 to maintain the sealed integrity of the panel sections and include channel 78 receiving recesses. Each of panels WP and CWP also includes an upper channel-shaped structural member (formed for example, of aluminum) generally designated by 74, which extends longitudinally along and defines the upper wall of each of the panels WP and CWP, as best seen in FIGS. 6, 11 and 12. Flanges 75 and 77 of member 74 are respectively interfacially bonded to skin members 64 and 62 by a suitable adhesive, such as one of the epoxy thermosetting resinous materials mentioned above, so as to maintain the sealed integrity of the panels. Member 74 is also welded to each of structural members 30 and 32 to maintain the sealed integrity of the wall panel.

It will be understood that the corner wall panel construction CWP is generally similar to the sidewall panels constructions WP, and differs primarily in the provision of interior and exterior corner skins 62' and 64', as best seen in FIG. 7.

In FIGS. 2 and 6 are illustrated a variety of typical types of wall panel WP constructions, which may be employed with the present invention. Shown in FIGS. 2 and 6, by way of example, is a panel which includes utilities indicated at $U_1$, $U_2$, $U_3$ and $U_4$; panels which include stanchions or structural column members 85; a panel which includes an exhaust duct 85 which communicates with the interior of enclosure 10; a panel which provides a door indicated at 90; and a panel which provides a double-walled window 92, as shown. It will be understood that door 90 and window 92 panels are also sealed prefabricated constructions according to the invention. The term "utilities" as employed herein throughout the specification and claims is intended to include such utilities or power supplies as are commonly required in clean rooms or controlled atmosphere enclosures, which by way of example (and not limitation) includes such utilities as an electrical power supply which terminates at a supply outlet box in the enclosure 10 (schematically illustrated in FIGS. 2 at $U_2$ and $U_3$), high pressure air lines (schematically illustrated in FIG. 2 at $U_4$), gas lines, process vacuum piping (schematically illustrated in FIG. 2 at $U_1$), vacuum sources for cleaning, exhaust and/or supply air ducts (an exhaust duct is schematically illustrated in FIGS. 3 and 6 at 85, and structural column members or stanchions (such as pipe 84 shown in FIGS. 2, 3, 6 and 7).

While utilities are generally provided in the walls of conventional clean-room constructions, such as those which are fabricated and erected in situ, another feature according to the present invention is that the desired utilities are disposed within and are molded into the individual prefabricated panel units WP or CWP. The desired utilities, e.g. $U_1$, $U_2$, $U_3$ and $U_4$ are disposed within the interior void space of the panel member WP, as defined by the skin members 62, 64, structural members 30 and 32; and the remaining void space is infilled with a relatively incompressible, thermally insulating material 82 which serves the multiple function of (1) thermally insulating the wall panel construction, (2) co-operates to maintain and mold the utilities into final assembled relationship within the wall panel, and (3) serves to add structural rigidity to the prefabricated wall panel unit. Thermally insulated material 82 is bonded to each of the relatively thin sidewalls or skins 62 and 64, and to members 30 and 32, as well as to the utilities disposed therein, to provide a relatively rigid wall panel construction, with the utilities maintained in fixed, assembled relation therewithin. An example of a suitable thermally insulating material 82 is urethane, a rigid polyether foam material, which may for example, be poured into the panel in liquid form and reacted with a suitable catalyst to convert the liquid into the rigid, relatively incompressible foam formation, or applied into the panel in a solid preformed condition.

I have found that urethane provides a desirable solid mass which, in addition to its thermal insulating properties, provides added structural strength and rigidity to the wall panel construction, as well as molding and maintaining the utilities in desired, final, assembled relation within the wall panel. Another advantage of the urethane, in contrast to thermal type insulation used in many conventional clean room constructions, is that urethane is relatively dust-free, and thereby does not create any problems in maintaining the controlled atmosphere of enclosure 10 within prescribed dirt or dust content limits.

The sealed, substantially air-tight adhesive bonded wall panel construction of the present invention further serves to prevent dirt or dust infiltration into the atmosphere of enclosure 10. Another example of a suitable material for infilling the wall panel members is Styrofoam, which is a trademark of the Dow Chemical Company for a foam or bubble type polystyrene plastic.

Columns 84, in addition to being held in place within their respective panels WP or CWP, by the thermally insulating material 82, are also welded to upper and lower channel members 74 and 70, respectively, as at 93 and 95 (see FIGS. 9, 11 and 12).

According to another feature of the present invention, means in the form of a locking panel unit generally designated by LP is provided for detachably interconnecting and securing adjacent pairs of prefabricated wall panels WP and/or CWP together into a rigid, sealed wall assembly. Referring now to FIGS. 7 and 8, locking panel unit LP comprises a vertically extending structural member, generally designated by numeral 94, formed, for example of steel, which includes a pair of spaced, transversely extending (with respect to wall panels WP) substantially parallel plate members 96 and 98 which respectively abut plate sections 52 and 50 respectively of structural members 32 and 30 in the adjacent wall panels. Member 94 also includes a pair of substantially coplanar spaced plate sections 100 and 102 which respectively mate and abut with plate sections 56 and 54 respectively of structural members 32 and 30 of the adjacent panels. Plate members 100 and 102 are each respectively interconnected with plate members 96 and 98 adjacent one end thereof and extend normally thereto and toward each other, as shown. Structural member 94 also includes a plate member 104 spaced from and substantially parallel to plate members 100 and 102. The ends of plate member 104 are respectively interconnected with the free ends of plate members 100 and 102 by diagonally extending, sloping wedge surface providing plate members 106 and 108, as clearly shown in FIGS. 7 and 8. Sloping wedge members 106 and 108 diverge toward the interior of enclosure 10 and converge toward the exterior of enclosure 10, as seen in FIG. 7. Wedge members 106 and 108 are arranged for mating, abutting, interfacial relation respectively with diagonal wedge surfaces 48 and 46 respectively of structural members 32 and 30 of the adjacent wall panels, as shown in FIG. 7. Sloping wedge members 106 and 108 are respectively provided with a bolt-receiving opening 107 and 109, the diameter of which is considerably in excess of that of the bolt to be received therein so as to permit some relative movement therebetween (see FIG. 7).

Each of members 32 and 30 is respectively provided with a channel-shaped structural reinforcing member, generally referred to by numerals 110 and 112. Structural members 110 and 112 each respectively includes a pair of parallel sidewalls or legs 114, 116 and 118, 120 which are respectively interconnected with and by transversely extending plate sections 122 and 124. Each of members 114, 116 and 118, 120 is beveled at one side so as to respectively mate with sloping wedge-providing surface plate portions 48 and 46 respectively of structural members 32 and 30, as best seen in FIG. 8. Members 110 and 112 are each respectively received within the space provided by and respectively abut against plates 36, 44 and 40 of member 32 and plates 34, 42 and 46 of member 30, as shown. Plate portions 122 and 124 lie substantially flush respectively with adjacent plates 56 and 54 of members 32 and 30, as shown. Members 110 and 112 are formed, for example, of steel and are respectively secured to structural members 32 and 30, as by welding, as shown in FIG. 7.

Each of plate sections 122 and 124 respectively provide bolt-receiving apertures 130 and 132, which are respectively in register with apertures 68, 107 and 66, 109. Each of structural members 30 and 32 are respectively provided with a threaded fastener in the form of a bolt member 148, 150 each of which is respectively received in and extends through apertures 132, 66 and 130, 68, and is welded at one end thereof adjacent the bolt head respectively to plate members 124 and 122, as best seen in FIG. 7.

As is clearly shown in FIG. 8, structural member 94 also includes a plurality of vertically spaced reinforcing plates 134 formed, for example, of steel and secured to plate section 104, as by welding. Each of plates 106 and 108 respectively has a projecting tubular bolt-receiving sleeve 136 and 138 secured thereto, as by welding, as shown. Each of sleeves 136 and 138 has a diagonal or sloping end portion which respectively mates and abuts with sloping wedge plates 106 and 108 to facilitate assembly and welding. The free ends of tubular bolt-receiving members 136 and 138 are respectively provided with an enlarged diameter cup-shaped portion 140 and 142 secured thereto as by welding, as shown. The bottom wall 141 and 143 respectively of each of cup-shaped portions 140 and 142 is respectively provided with a bolt-receiving aperture 144 and 146. The diameter of tubular members 136, 138 and of apertures 144, 146 is considerably in excess of that of bolt members 148 and 150, to permit some relative movement therebetween.

Structural member 94 also includes a pair of substantially coplanar flanges 156 and 158 which extend toward each other and normally to plate sections 96 and 98, as shown in FIGS. 7 and 8. Locking panel LP includes a relatively thin, exteriorly facing sidewall or skin 65, formed for example, of aluminum, which is disposed for substantially flush alignment with adjacent portions of the exterior sidewalls or skins 64 or 64' (in the case of corner wall panel CWP) on the adjacent wall panels. Skin 65 is disposed in abutting, interfacial contact with flanges 156 and 158 and is bonded thereto in substantially air-tight sealed relation, by means of a suitable adhesive, such as an epoxy or thermosetting resinous material mentioned above.

Skin 65 provides a plurality of spaced pairs of apertures 67 and 69 to provide external access respectively to cup-shaped portions 140 and 142.

Except for reinforcing plates 134, member 94 is preferably integrally formed but may be totally or partially fabricated, if desired. Locking panels LP are also provided with upper and lower wall defining structural members respectively 160 and 162 (see FIG. 9) which are secured to member 94 and skin 65 and correspond respectively to members 70 and 74 of the wall panels WP. The interior void space in the sealed locking panel LP is also infilled with a relatively incompressible thermally insulating material 82, such as that described above in connection with the prefabricated sealed wall panels WP.

Referring now to FIGS. 1–4 and 6–8, the walls of a modular controlled enclosure according to the present invention can be quickly and easily erected, for example, within an existing building having a floor 20 in the following manner: locating shoes or channel members 78 are arranged on and secured to the floor or supporting surface 20, according to the outline of the desired enclosure, which if as illustrated in the exemplary embodiment in FIG. 1 would be rectangular. The dimensions of the rectangle formed by shoes or channels 78 are approximately that of the enclosure to be erected, measured substantially along the centerline ( though not necessarily) of the wall panel members. The shoes 78 are substantially continuous about the periphery of the room, except for discontinuities to accommodate the stanchions or columns 84 and doors 90, as best seen in FIGS. 2 and 7. After channel members or shoes 78 are fixed to the floor 20 by fastening means 80 in the desired configuration, the desired wall panel members WP (e.g. door panel, window panels, utility panels, etc.), locking panel members LP and corner wall panel members CWP are placed over the channel members, as best seen in FIG. 9, with channel member 78 received in the channel-receiving openings 76 provided by each of panel members WP, LP and CWP. Where enclosure 10 is a room inside an existing building, the panels merely rest on the channels.

It will be understood that where the modular controlled atmosphere enclosure is to comprise or be erected as a separate building, rather than a room in an existing structure, the additional means for further securing wall panel LP to the structural member 78 may be required to meet local building code requirements.

Channel member 78 co-operates with the channel-receiving recess 76 in each of the panel members to quickly initially orient and align the panel members, and after the parts are locked into a sealed, rigid wall assembly, channels 78 co-operate to maintain the panels in fixed, oriented relation. Thereafter, the adjacent pairs of wall panel members WP and/or WP and CWP are quickly and easily detachably locked together into a substantially air-tight sealed and aligned rigid wall assembly by the locking panel members, in the manner to be more fully described below.

Figure 4:
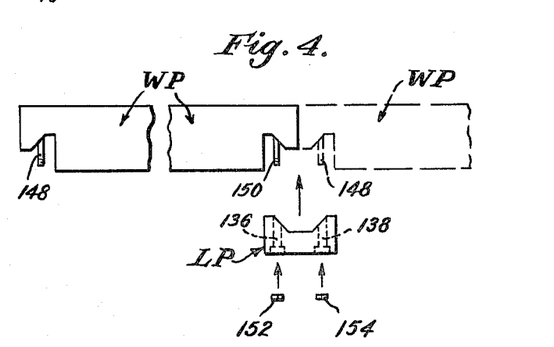
FIG. 4 is a partially exploded plan view schematically illustrating the co-operative interrelationship between a pair of adjacent wall panels and a locking panel member forming part of the enclosure shown in FIGS. 1–3.
Figure 5:
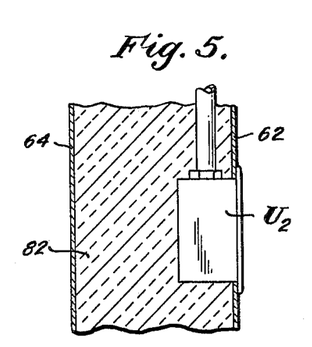
FIG. 5 is a fragmentary sectional view taken on line 5—5 of FIG. 2.

After a pair of adjacent sealed prefabricated wall panels have been initially aligned and oriented on shoes 78, adjacent plate sections 36 and 34 respectively of structural members 32 and 30 of adjacent panel sections are initially brought into abutting interfacial relation, as shown in FIGS. 4, 7 and 8. In this condition, abutting adjacent structural members 32 and 30 provide a recess having a configuration corresponding to that of the locking wall panel LP, as best seen in FIGS. 4 and 8. The locking panel is thereafter moved in the direction of the arrows shown in FIGS. 4 and 8, into mating interfitting engagement with each of structural members 32 and 30 of the adjacent wall panels. In moving the locking wall panel LP into the mating interfitting interengagement with each of the adjacent wall panels from the position shown in FIGS. 4 and 8 to that shown in FIG. 7, bolt members 150 and 148 are respectively and successively received within bolt-receiving apertures 107, 109, within the tubular bolt-receiving members 136 and 138 with the free threaded end of the bolt members 150 and 148 respectively projecting through the apertures 144 and 146 of the cup-shaped members 140 and 142. When the parts are aligned, as thus far described, the following pairs of members are in abutting interfacial relation: plate members 36 and 34, wedge surfaces 48, 106 and 46, 108; plate members 42 and 44 respectively of structural members 30 and 32 may or may not at this time be in interfacial abutting engagement with plate member 104 of the locking panel LP. Thereafter, nuts 154 and 152 are tightened respectively about the free ends of bolt members 148 and 150, exterior access to nuts 152 and 154 being provided by apertures 67 and 69. Upon tightening of nuts 152 and 154, a wedging action takes place along the diverging wedge surfaces 106 and 108 of the locking panel (through co-operation with wedge surfaces 48 and 46) which serves (1) to wedge plate members 36 and 34 into sealed, substantially air-tight abutting interfacial contact, (2) serves to move both structural members 30 and 32 against plate section 104 to align the panels and to align the interior exposed surfaces of adjacent mating portions of the interior sidewalls or skins 62 (or 62' in the case of a corner wall panel) into substantially flush sealed relation, thereby advantageously avoiding any dirt or dust collecting corners on the interior surface, and (3) to wedge the adjacent aligned edges 63 and 65 of the interior skins or sidewalls 62 or 62' of the adjacent wall panel sections into sealed, substantially air-tight, abutting interfacial contact.

Figure 14:
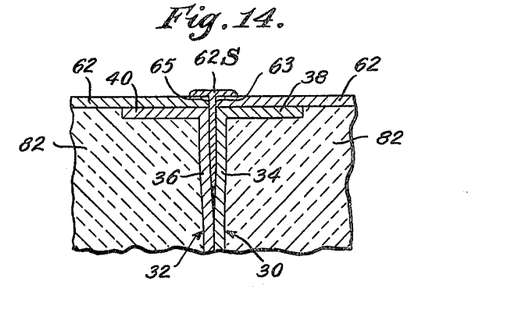
FIG. 14 is a fragmentary plan section illustrating a sealing means interposed between abutting edges of parts of a pair of adjacent wall panel units.

To further insure a substantially air-tight seal between adjacent panels, particularly between edges 63 and 65 and between members 34 and 36 adjacent thereto, sealing means such as a flexible T-shaped molding strip 62S (see FIG. 14) formed, for example, of aluminum or the like or a sealing compound such as an epoxy material can be inserted, if desired, in the joint between edges 63 and 65 and between plate members 34 and 36 at a portion adjacent skins 62, prior to final tightening of bolts 148 and 150. After the locking panel LP has been locked to the adjacent wall panels to provide a rigid sealed wall assembly, openings 67 and 69 are sealed by a conventional spring clip cap 71, as shown.

It will be understood that while the sidewall panels have been described and illustrated as having the bolt members secured thereto and extending outwardly into the locking panel, that the nut members 152 and 154 may instead be secured to the plates 124 and 122 in some applications, in which case the bolt members would be inserted from the exterior of the locking panel. However, the present arrangement is preferred because the bolts contribute to orienting and aligning the parts prior to final assembly.

Conveniently, the door, window and utility panels are made in standard sizes and are mutually and readily interchangeable to provide for flexibility of construction and ease in erection and assembly of the modular enclosure 10.

It will be seen from the above, that the present invention provides for flexibility in design and construction, which permits a great number of variations in enclosure constructions, even after the various panels have been assembled into an erected enclosure. Thus, should it be desired to modify or enlarge an already assembled or erected modular enclosure 10, the necessary individual panels can easily and quickly be disassembled and the replacement or additional panels installed.

Referring now to FIG. 9, the interior of the enclosure is provided with a floor covering 170 which can, for example, be vinyl or any suitable material having a smooth finish, which can be easily cleaned. According to another feature of the present invention, the floor covering 170 is interconnected with the walls of enclosure 10 adjacent the joint between the walls and the floor 20 in such a manner as to avoid creation of dust and dirt collecting corners or pockets.

As best seen in FIG. 9, a coping member 172 (formed for example of wood) having an exposed curvilinear surface 174 is provided at the intersection of the floor or supporting surface 20 with the walls of the enclosure. Coping member 172 extends peripherally about the interior of the modular enclosure 10. The interior of the walls of the enclosure 10 adjacent the floor 20 is provided with a peripherally extending recess 176. Floor covering 170 extends along the floor and includes an upstanding portion 178 which extends over the curvilinear surface 174 of the coping member 172, and upwardly along and within recess 176, as best seen in FIG. 9. Recess 176 is defined by the upstanding flange portion 72 (of the lower member 70) which is offset from interior skin member 62 sufficiently to receive the full thickness of the floor covering so that the interior surface 179 of portion 178 is aligned substantially flush with the adjacent interior surface of skin 62 to thereby avoid creating any dust collecting joints or crevices. A filler member 180 may be interposed between flange portion 72 and skin 62 to accommodate various thicknesses of floor coverings. Filler piece 180 is bonded to flange portions 72 and skin 62 by means of a suitable adhesive, such as one of the thermosetting resinous materials mentioned above.

Floor covering 170, and particularly upstanding portion 178 thereof, is cemented or bonded to coping member 172 and upstanding flange member 72 by means of a suitable adhesive, such as, for example, a pressure sensitive adhesive tape disposed therebetween. It will be understood that the adhesive employed is preferably such that floor covering 170 can be removed from flange 72 and coping member 172 without too much difficulty to facilitate dismantling or modifying the enclosure 10.

It will be seen from the above and from inspection of FIG. 9, that the floor covering 170 in assuming the contour of the curvilinear surface 174 of coping member 172 at the intersection of the floor and wall members, and in having its inner surface 179 meet substantially flush with inner surface 62 of the skin member, advantageously eliminates creation of dust or dirt collecting crevices and pockets, and facilitates maintenance and cleaning of the interior of the enclosure 10.

After the walls of enclosure 10 have been erected, as described, a modular ceiling or roof construction, generally designated at 22 (in the case of an exterior modular control building) is assembled.

Each of walls 12, 14, 16 and 18 includes a plurality of abutting angle irons 190 extending longitudinally along the upper surface thereof, with the inner surface of the upstanding leg 192 thereof disposed substantially flush with the exposed interior surface of interior skin member 62, as best seen in FIGS. 9–12. Each of angle irons 190 is secured to a respective upper channel member 74 of panels WP as by welding, and extends along the entire length of its respective panel WP, as shown. Each of walls 14 and 18 respectively includes a channel-shaped strut member 194 and 197 extending substantially along the entire length thereof, as best seen in FIG. 1. Each of walls 12 and 16 respectively includes a plurality of strut member segments 193 and 195 extending substantially along the entire length thereof. Each of strut member segments 193, 195 and strut members 194, 197 extends longitudinally along the inner surface of leg 192 of each of angle iron members 190, and is secured to the upstanding leg 192 by means of a plurality of threaded fasteners 200, as best seen in FIGS. 9 and 11. Each of channel-shaped strut segments 193, 195 and strut members 194, 197 is provided with a longitudinally extending opening 196, which is defined by a pair of downwardly extending return-bent portions 198 and 199, as best seen in FIGS. 9 and 13.

Each of walls 14 and 18 is provided, at the upper surface, with a plurality of relatively short channel-shaped strut segments 202, which may be similar or identical in construction to strut segments 193, 195 and strut members 194, 197 described above.

Short strut segments 202 are provided only on the column 84 bearing panels in walls 14 and 18, and serve to support truss units, generally designated by numeral 210, which will be described in greater detail below. The strut segments 202 are disposed in axial overlying relationship to the columns or stanchions 84, and are secured to the upper wall channel members 74, as by welding, as best seen in FIGS. 6, 11 and 12. Modular enclosure 10 includes a plurality of support truss units 210, each of which includes a pair of spaced, lower angle irons 212, 214 and a pair of spaced, upper angle irons 216, 218 and a plurality of diagonally extending chord members 220 extending between and secured to upper and lower pairs of angle iron members 216, 218 and 212, 214 in a known and conventional manner, as best seen in FIGS. 11 and 12.

Each of truss units 210 is preferably preassembled as a separate unit. As best seen in FIG. 1, each of the truss units spans walls 14 and 18, and is supported on the short channel strut segments 202 mounted on walls 14 and 18 (see FIGS. 9, 11 and 12). Truss units 210 are secured to the short channel strut segments 202 by means of a bolt 222, which is received within a washer 224 which spans the distance between angle irons 212 and 214, and rests on top of the vertical legs thereof (as best seen in FIG. 11) and extends through space 196 into threaded engagement with a threaded plate-like nut member 226, disposed within strut segments 202 and which engages the underside of return bent portions 198 and 199 (e.g. shown in FIGS. 9 and 13) when bolt member 222 is tightened to firmly clamp and tightly secure the lower truss angle irons 212 and 214 to the strut segments 202.

After the truss units 210 have been clamped and tightly secured to the strut segments 202, the peripherally and longitudinally extending strut members 194, 197 and strut member segments 193, 195 are secured in suspended relation to the truss units 210, by means of bolts 222, washers 224 and nuts 226, in the same manner as that described above for the connection of strut segments 202 to the angle irons 212 and 214.

Figure 10:
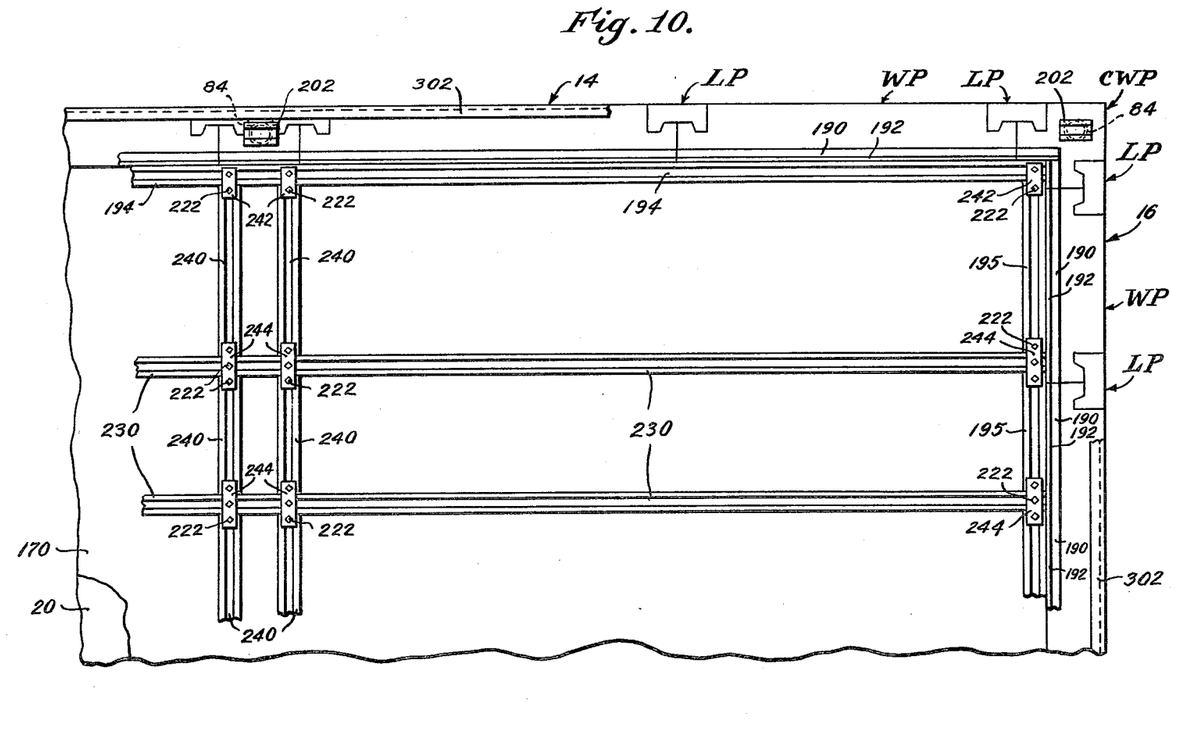
FIG. 10 is a fragmentary plan view, with certain parts omitted for clarity of illustration, of a ceiling panel supporting framework for the enclosure shown in FIGS. 1–3.

Thereafter, a plurality of elongated strut units or members 230 are arranged in spaced, substantially parallel relation to each other and to walls 14 and 18 (and to strut members 194 and 197, as best seen in FIGS. 1 and 10) and are suspended from adjacent pairs of truss units 210. Each of strut units 230 are substantially identical in construction to strut members or segments 193, 194, 195 and 197 described above, and span the distance between walls 12 and 16, as seen in FIG. 1. Members 230 are secured in suspended relation to the truss units 210 by means of bolts 222, washers 224 and nuts 226, in the manner described above for the connection of strut segments 202 to truss angle irons 212, 214.

The ceiling or roof construction 22 also includes a plurality of transversely extending strut members 240, as best seen in FIGS. 1 and 10, which are disposed in spaced, parallel relationship to each other and extend generally parallel to strut member segments 193 and 195 of walls 12 and 16, and normally to strut members 194, 197 and 230. Strut sections or members 240, as well as members 193 and 195, extend between longitudinally extending strut members 194 and 230, adjacent pairs of strut members 230 or between strut members 230 and 197, and are supported by members 194, 230 and 197 by means of mounting plates, the two-hole type mounting plate being indicated at 242 and the three-hole mounting plate being indicated at 244. Mounting plate 242 is employed where two strut members meet in a T-intersection such as shown in FIG. 10 at the intersection of strut members 240 and 194. The three-hole type mounting bracket 244 is similar to 242, and serves to unite three adjacent strut members, such as shown in FIG. 10, where two transversely extending strut members 240 are disposed on opposite sides of and intersect with longitudinally extending strut member 230. Each of mounting plates 242 and 244 is disposed on the upper surface of and spans the two or three (in the case of plate 244) adjacent intersecting struts which are to be interconnected. A bolt 222 is disposed in each aperture in plates 242 and 244 and each bolt is received within a respective strut member to be interconnected and is fastened to a nut 226, within the respective strut member, in the manner described above for strut section 202. Tightening of the bolts 222 within nuts 226 tends to move each of the adjacent strut members, e.g. 194 and 240, upwardly to seat against the mounting plate, and thus serves to vertically align the parts. The mounting plates 242 and 244 thus serve to firmly unite adjacent normally extending and intersecting strut sections, and serve to maintain the struts in vertically aligned, as well as horizontally aligned, relation to provide a ceiling panel framework support with a plurality of rectangular ceiling panel receiving openings, some of which are shown in FIG. 10.

Strut member segments 193 and 195 are similarly secured to longitudinally extending struts 194 and 230 by means of mounting plates 242 and 244 in addition to being secured to leg 192 of the angle iron 190, as described above.

Each of strut members 194, 197 and strut segments 193, 195 is provided with an L-shaped molding member 250 formed, for example, of aluminum, which provides a single seating flange or projecting lip 252. Molding member 250 extends longitudinally along substantially the entire length of strut members 194, 197 and strut segments 193, 195. The vertically extending leg of the molding member 250 is secured to the strut members at spaced points therealong by a convenient means, such as by threaded fasteners 253, as shown in FIG. 9.

The exterior struts 193, 194, 195 and 197 are all provided with single seating flange or lip providing type moldings 250, as above described. The interior struts 230 and 240 are provided with double seating lip or flange type moldings, generally designated at 270. Moldings 270 extend substantially along the entire length of each of interior strut members 230 and 240, and as best seen in FIG. 13, are generally U-shaped and include a pair of legs 271 and 273, which are secured to struts 230 and 240 at spaced points therealong by means of threaded fasteners 276. Moldings 270 provide a pair of flanged seating portions or projecting lips 274, as shown. The lips 274 and 252 respectively on struts 230, 240 and the wall struts 193, 194, 195 and 197 provide rectangular shaped seating pockets for receiving and supporting various ceiling panels which comprise the modular ceiling (or roof) 22.

As best seen in FIG. 12, the spacing between the adjacent struts 230 or between the strut 230 and the wall struts 193, 194, 195 or 197, is such as to accommodate a desired ceiling panel unit. In FIGS. 11 and 12 are shown examples of typical prefabricated ceiling panel units, which include a plenum chamber unit generally designated by numeral 260, a lighting fixture panel unit, generally designated by numeral 290, and a filler panel unit generally designated by numeral 296 (as best seen in FIG. 11). Plenum chamber panel 260 is of a double-walled construction, the walls being indicated at 262 and 264, and formed for example, of aluminum. The space between walls 262 and 264 is infilled with thermally insulating material 82, such as urethane or the like, described above. As in the case of the wall panel units WP, LP and CWP described above, the thermally insulating material 82 is bonded to each of inner and outer walls 262 and 264, and serves to add structural rigidity to the plenum chamber unit 260. The exterior plenum chamber 260 is provided with a peripherally extending notched seating portion 265, as best seen in FIG. 11. Notch 265 is defined by an extension 267 of the inner wall 264 and a lower plate or wall member 280 which is welded to inner and outer wall members 262 and 264 to provide a sealed, double wall construction for the plenum chamber unit 260. Plenum chamber unit 260 also includes a panel 269 which is exposed to the interior of enclosure 10, and is perforated to permit the passage of air therethrough, as indicated by the arrows in FIG. 12. Panel 269, in practice, is formed separately from plenum 260.

Plenum chamber unit 260 also includes a supply duct attachment 275 mounted thereon, as shown in FIG. 12, for supplying air into the interior of the plenum chamber, as suggested by the elongated arrows in FIG. 12. Supply duct attachment 275 may be mass produced and formed with the plenum chamber as a separate, prefabricated unit. Supply duct 275 includes a portion 277 which extends exteriorly of the plenum chamber, and is adapted to be telescopically received within an air supply duct 278, as best seen in FIG. 12. Air duct 278 is preferably double walled, as best seen in FIG. 12, with the space between the walls infilled with a thermally insulating material 82, such as urethane or the like, described above. Duct 278 forms part of an external ventilation supply system for enclosure 10, as shown and suggested in the dashed lines in FIGS. 1 and 3, and indicated generally at 278S.

To assemble the plenum chamber panel into the operative position in the modular ceiling construction, such as shown in FIG. 12, the preforated (generally rectangular) panel 269 is placed into the seating pockets defined by the struts and positioned on and disposed in supportive engagement with the supporting lips or flanges 252 and 274. Thereafter, the plenum chamber 260 is seated in the pockets defined by the struts with plate 280 of notch 265 resting on each of the struts, as shown in FIG. 12. Extension 267 of the inner wall 265 rests on top of perforated panel 269 to maintain the latter in a final assembled position, as best seen in FIG. 13.

Ordinarily, the weight of the plenum chamber and duct 275 attachment is adequate to provide a substantially air-tight seal between the plenum and the supporting struts and molding flange. However, to further insure an air-tight seal, it may in some cases be preferred that the plenum chamber unit 260 also be fastened in a positive manner to the supporting struts. As best seen in FIGS. 12 and 13, this is accomplished for example, by providing a plurality of peripherally spaced, bolt-receiving recesses 272 along the lower side of the plenum chamber 260, adjacent plate 280 in which are received bolts 222, which extend through suitable bolt-receiving apertures provided in plate member 280, and are threadedly engaged with nut members 226 to firmly mount and tightly secure the plenum chamber to the supporting struts. If desired, a sealing material, for example in the form of a caulking compound or a resilient gasket may also be interposed between plate 280 and the upper surface of the supporting strut (e.g., strut 230, as seen in FIG. 13) to further insure an air-tight seal.

Lighting fixture panel 290 may, for example, include fluorescent light fixtures 291 and a translucent panel 292 which is exposed into the interior of enclosure 10. Translucent panel 292 is illustrated as rectangular in shape and is supported in a U-shaped, peripherally extending gasket member 294 formed of a flexible, resilient material, a suitable example being rubber. Gasket 294 and translucent panel 292 are seated in the rectangular seating pocket provided by the struts and by seating flanges 274 and/or 252 of the molding members 270 and 250, and are supported by the seating flanges, as seen in FIGS. 12 and 13. Lighting fixture panel 290 is supported on and rests on top of the gasket member 294, as shown. Means in the form of an L-shaped clamp 295, as best seen in FIGS. 12 and 13, is also provided to fasten or clamp the lighting fixture panel 290 to the supporting struts in a positive manner. Each of bolts 222, which are received within bolt-receiving recesses 272 of the adjacent plenum chamber, also extends through the long leg of clamp 295 with the short leg 296 of the clamp 295 engaging a peripherally extending shoulder 293 provided by panel 290, as shown in FIG. 13, to firmly mount and detachably clamp the light panel 290 to provide a substantially air-tight sealed mounting for the light panel so as to maintain the integrity of the controlled atmosphere within the enclosure 10.

Referring now to FIG. 11, there is shown another type of a typical prefabricated ceiling panel unit in the form of a sealed filler panel, generally referred to by numeral 298. Filler panels 298 comprise a sealed, box-like hollow construction formed, for example, of aluminum or steel, with the hollow interior infilled with thermal insulating material 82, such as for example, urethane or the like described above. The thermal insulating material 82 is bonded to the metal shell of the box-like filler panel 298, and serves to add increased rigidity thereto. The filler panel 298 as shown in FIG. 11, like the panels 260 and 290, is received and supported within the rectangular seating pocket provided by the struts and seating lips or flanges 274 of the molding members 270. As shown in FIG. 11, panels 298 extend underneath the truss units 210, and are detachably clamped and maintained in fixed, assembled relation by means of plate members 299, which are peripherally spaced about the filler panel (as shown in FIG. 1) and are secured to the strut members 230 and 240, by means of bolts 222 and nuts 226. Panels 298 are generally employed to fill in the remaining spaces, e.g., between a truss or wall and a plenum chamber or lighting fixture panel. The plenum chamber and lighting fixture panels are preferably made in standard sizes so that the number and sizes of required filler panels will vary depending on the particular design of the enclosure 10.

Referring now to FIG. 1, it will also be understood that although the ceiling construction 22 has been illustrated by way of example as comprising an alternate arrangement of plenum chamber panels 260 and lighting fixture panels 290, that if desired, various light panels or plenum chambers could be replaced by filler panels 298 of appropriate dimension.

Enclosure 10 is provided with a conventional molding, generally designated by numeral 258, disposed at the interior intersection of the upstanding sidewalls and the ceiling 22, as shown in FIG. 9. By way of example, molding 258 may be a two-piece, snap-on conventional construction which includes an angle section 259 positioned at the intersection between the sidewalls and the ceiling 22, and in abutting engagement with the underside of the member 250, as best seen in FIGS. 9 and 12. Angle section 259 is detachably secured to the struts 193, 194, 195, and 197, and to molding 250 by means of a plurality of spaced, threaded fasteners 261, as best seen in FIG. 9. Fasteners 261 thus also serve to support and firmly secure the other leg of the molding 250 to the struts. After molding section 259 is secured in place by threaded fasteners 261, the other molding part 263 is detachably snapped or clipped onto part 259.

Exhaust ducts 85, which are molded into various wall panels, such as shown for example, in FIGS. 3 and 6, extend beyond the upper surface of the wall panel members and are detachably telescopically interconnected with an exhaust duct 279 carried by the ceiling.

After the enclosure 10 has been assembled and erected in the manner described above, and the utilities properly interconnected, an exteriorly facing channel 302 can be disposed peripherally about the entire exterior of the enclosure 10, as shown in FIGS. 1, 11 and 12. Utility channel 302 can be secured to the upper portion of the walls, as by threaded fasteners 304, as seen in FIG. 11. Channel 302 is primarily for aesthetic purposes, and may be omitted, if desired, within the purview of this invention.

It will be seen from the above that the present invention provides a modular construction wherein the wall and ceiling panels can be mass produced as separate prefabricated units of standard and interchangeable sizes by lower cost, mass production methods away from the site of erection of the enclosure, wherein conveniently the wall panel units include utilities in the panels which are rugged and thermally insulated.

Another advantage of molding the utilities within the prefabricated panel units is that erection time at the site is considerably minimized and the utilities are advantageously arranged so that all maintenance for the utilities (both in the walls and ceiling) can be accomplished from the exterior of the enclosure 10.

It will also be seen from the above that the present invention provides a construction wherein the modular wall and modular ceiling construction can be quickly erected and dismantled or modified as desired (after erection) in an economical and expedient fashion, merely by fastening or unfastening various sets of bolts and clamp members, etc., and various changes or interchanges of panels can easily be accomplished in a relatively short period of time with little or no disturbance to the interior of the room or to the area surrounding the enclosure site.

It will be understood that the present invention is applicable to modular controlled atmosphere enclosures in less critical applications that in so-called clean rooms. It will also be understood that the present invention is useful for applications other than so-called clean rooms and may be used wherever applicable.

In view of the above, it will be seen that the several objects of the invention are achieved and other advantageous results attained.

As many changes could be made in the above constructions and methods without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

I claim:

1. A modular enclosure comprising a supporting surface and a plurality of prefabricated interconnected wall panel units disposed on said supporting surface; each of said units including first and second vertically extending opposed spaced part structural members defining endwalls for said panel units, each of said first and second structural members providing a pair of spaced apart vertically extending flange portions extending transversely in a direction toward each other, respective ones of the flange portions of each of said first and second structural members being aligned in substantially coplanar relationship; said wall panel units also including third and fourth structural members each providing flange portions aligned in substantially coplanar relationship with the flange portions of said first and second structural members, said third and fourth structural members respectively defining top and bottom walls for said wall panel units, a pair of spaced apart opposing sheet-like sidewall members each respectively adhesively secured in sealed airtight relationship to respective aligned coplanar flange portions of said first, second, third and fourth structural members; the void space enclosed by said sidewalls and structural members being infilled with a relatively incompressible thermally insulating material bonded to said sidewalls and structural members adding structural rigidity to the wall panel units; each of said first and second structural members including a vertically extending sloping portion adjacent one side thereof defining a pair of wedging surfaces diverging in a transverse direction away from said wall panel unit; the sidewalls of one panel unit being in substantially coplanar relationship with the sidewalls of adjacent aligned wall units, the juxtaposed sloping wedge portions of each aligned pair of adjacent wall panel units converging in a direction away from said wall units, a vertically extending prefabricated locking panel overlapping the juxtaposed sloping wedge portions of each aligned pair of adjacent wall panel units, said locking unit including a pair of vertically extending sloping wedge surfaces in respective mating engagement with the overlapped juxtaposed pair of sloping wedge portions of said aligned pair of adjacent wall panel units; threaded fastener means detachably securing said locking panel to its respective pair of aligned adjacent wall panel units wedgingly securing said wall panel units into aligned and sealed relation; and selected ones of said wall panel units including utility means therein disposed in said void space enclosed by said sidewalls and structural members, and said thermally insulating material also being bonded to said utility means and being the sole means maintaining the latter in aligned position within the wall panel.

2. The modular enclosure as set forth in claim 1 and wherein said thermally insulating material is an expanded plastic foam.

References Cited by the Examiner

UNITED STATES PATENTS

| | | | |
|---|---|---|---|
| 1,483,941 | 2/1924 | Kasson | 52—273 |
| 1,555,392 | 9/1925 | Tracy et al. | 52—273 |
| 1,611,317 | 12/1926 | Overton | 126—114 |
| 2,243,373 | 5/1941 | Crites | 52—220 |
| 2,373,808 | 4/1945 | Brown | 52—471 |
| 2,463,047 | 3/1949 | Naysmith et al. | 52—220 |
| 2,481,972 | 9/1949 | Betts | 287—189.36 |
| 2,546,290 | 3/1951 | Anderson | 52—276 |
| 2,589,633 | 3/1952 | Shepheard | 52—620 |
| 2,692,664 | 10/1954 | Ternes | 52—620 X |
| 2,888,113 | 5/1959 | Schwartz et al. | 52—28 |
| 2,962,133 | 11/1960 | Kivett et al. | 287—189.36 |
| 3,001,464 | 9/1961 | Moore | 98—40 |
| 3,065,686 | 11/1962 | Geocaris | 98—40 |
| 3,070,196 | 12/1962 | Switzgable | 52—404 |
| 3,113,401 | 12/1963 | Rose | 52—615 X |
| 3,160,248 | 12/1964 | Galajikian | 52—461 |

RICHARD W. COOKE, JR., *Primary Examiner.*

JOEL REZNEK, FRANK L. ABBOTT, *Examiners.*

M. L. MINSK, L. R. RADANOVIC, *Assistant Examiners.*